(12) United States Patent
Okoli et al.

(10) Patent No.: US 8,986,599 B2
(45) Date of Patent: Mar. 24, 2015

(54) METHODS OF FABRICATING CERAMIC PREFORMS WITH 2-D CHANNELS AND STRUCTURES PRODUCED THEREBY

(75) Inventors: Okenwa O. I. Okoli, Tallahassee, FL (US); Ben Wang, Tallahassee, FL (US); Osayande Lord-Rufus Ighodaro, Tallahassee, FL (US)

(73) Assignee: Florida State University Research Foundation, Inc., Tallahassee, FL (US)

( * ) Notice: Subject to any disclaimer, the term of this patent is extended or adjusted under 35 U.S.C. 154(b) by 777 days.

(21) Appl. No.: 13/218,005

(22) Filed: Aug. 25, 2011

(65) Prior Publication Data

US 2012/0052253 A1 Mar. 1, 2012

Related U.S. Application Data

(60) Provisional application No. 61/377,088, filed on Aug. 25, 2010.

(51) Int. Cl.
*C04B 35/10* (2006.01)
*C04B 35/101* (2006.01)
*C04B 38/00* (2006.01)
*C04B 111/34* (2006.01)

(52) U.S. Cl.
CPC ............ *C04B 35/101* (2013.01); *C04B 38/0003* (2013.01); *C04B 2111/343* (2013.01); *C04B 2235/3217* (2013.01); *C04B 2235/5248* (2013.01)
USPC .......................................................... 264/640

(58) Field of Classification Search
CPC ............................ C04B 2235/5208–2235/5272
USPC .......................................... 264/610, 640, 641
See application file for complete search history.

(56) References Cited

U.S. PATENT DOCUMENTS

| | | | | | |
|---|---|---|---|---|---|
| 3,539,667 | A | * | 11/1970 | Nameishi | 264/629 |
| 5,173,229 | A | * | 12/1992 | Miyamoto | 264/635 |
| 5,804,130 | A | * | 9/1998 | Furlani et al. | 264/610 |
| 2010/0227153 | A1 | | 9/2010 | Okoli et al. | |

OTHER PUBLICATIONS

Gozenbach et al., "Macroporous Ceramics from Particle-Stabilized Wet Foams," J. Am. Ceram. Soc. 90[1], pp. 16-22 (2007).
Hardy et al., "Mechanical Properties of a Partially Sintered Alumina," Journal of the European Ceramic Society, 15, pp. 769-775 (1995).

(Continued)

*Primary Examiner* — Joseph S Del Sole
*Assistant Examiner* — Russell Kemmerle, III
(74) *Attorney, Agent, or Firm* — Sutherland Asbill & Brennan LLP

(57) ABSTRACT

Methods are provided for making ceramic preforms having two-dimensional interconnected channels therein. The methods include (i) positioning a sacrificial material having a selected profile within a bed of ceramic powder; (ii) compacting the bed of ceramic powder to form a compacted mass; (iii) heating the compacted mass to thermally transform the sacrificial materials into a fluid without cracking the compacted mass; and (iv) removing the fluid from the compacted mass, thereby leaving a two-dimensional network of interconnected channels having the selected profile of the sacrificial material within the compacted mass. Ceramic preforms are also provided which include a compacted mass of ceramic powder and two-dimensional interconnected channels therein.

17 Claims, 8 Drawing Sheets

(56) References Cited

OTHER PUBLICATIONS

Ighodaro et al, "Fracture Toughness Enhancement for Alumina Systems: A Review," Int. J. Appl. Ceram. Technol., 5[3] pp. 313-323 (2008).

Marchi et al., "Alumina-aluminum interpenetrating-phase composites with three-dimensional periodic architecture," Scripta Materialia, 49, pp. 861-866 (2003).

Mattern et al., "Preparation of interpenetrating ceramic-metal composites," Journal of the European Ceramic Society, 24, pp. 3399-3408 (2004).

Sepulveda et al., "Processing of Cellular Ceramics by Foaming and in situ Polymerisation of Organic Monomers," Journal of the European Ceramic Society, 19, pp. 2059-2066 (1999).

Studart et al., "Processing Routes to Macroporous Ceramics: A Review," J. Am. Ceram. Soc., 89[6], pp. 1771-1789 (2006).

Wagner et al., "Interpenetrating Al2O3-TiAl3 Alloys Produced by Reactive Infiltration," Journal of the European Ceramic Society, 19, pp. 2449-2453 (1999).

Yoon et al., "Aligned porous alumina ceramics with high compressive strengths for bone tissue engineering," Scripta Materialia, 58, pp. 537-540 (2008).

* cited by examiner

US 8,986,599 B2

METHODS OF FABRICATING CERAMIC PREFORMS WITH 2-D CHANNELS AND STRUCTURES PRODUCED THEREBY

CROSS-REFERENCES TO RELATED APPLICATIONS

This application claims priority to U.S. Provisional Application No. 61/377,088, filed Aug. 25, 2010, which is incorporated herein by reference.

TECHNICAL FIELD

The present invention relates generally to ceramic materials for structural applications and more particularly to ceramic preforms having two-dimensional channels therein.

BACKGROUND

Ceramic materials possess properties such as high strength, high hardness, high stiffness, corrosion resistance, low coefficients of thermal expansivity, and lower density than most metals, which make these materials highly desirable for structural applications. However, ceramic materials also inherently possess low fracture resistance. As such, they are usually reinforced to enhance fracture resistance for suitability in structural applications. Various methods have been employed for reinforcing ceramic structures.

Conventional techniques such as particle reinforcement, laminated structures, co-continuous composites, and functional gradient methods, have been employed to enhance the mechanical resistance of ceramic materials. However, these methods either exhibit trade-offs between fracture strength and fracture toughness or are not amendable to proper control to achieve the desired end product properties.

For example, interpenetrating composites (IPCs), or co-continuous composites, may be fabricated by infiltrating molten metallic phase into porous preforms, as described in F. Wagner, et al., "Interpenetrating $Al_2O_3$—$TiAl_3$ Alloys Produced by Reactive Infiltration," J. Eur. Ceram. Soc. 19, 2449-53 (1999). Reactive melt infiltration has also been used to infiltrate porous preforms, as described in C. San Marchi, et al., "Alumina-aluminum interpenetrating-phase composites with three-dimensional periodic architecture", Scripta Materialia 49, 861-66 (2003). In these methods, the reinforcement phase is expected to fill the pores and channels of the preform to form a complete composite. Accordingly, due to the anticipated interconnectivity of the phases, IPCs are expected to exhibit higher mechanical resistance than other reinforcements. However, due to present limitations, property enhancements resulting from these methods fail to meet expectations. For example, during reactive infiltration, the reaction may not be complete, thereby resulting in residues which alter material properties. Additionally, the ceramic pore structure may be characterized by lack of pore connectivity and regularity, as is common in present methods of fabrication of porous ceramics.

For example, partial sintering of green bodies is a commonly used method of forming porous ceramics, but results in a high percentage of closed pores, as described in Dale Hardy & David J. Green, "Mechanical Properties of a Partially Sintered Alumina," J. Eur. Ceram. Soc. 15, 769-75 (1995) and A. Mattern, et al., "Preparation of interpenetrating ceramic-metal composites," J. Eur. Ceram. Soc. 24, 3399-408 (2004). Other techniques for fabricating porous ceramics include the replica method, invented by Schwartzwalder and Somers in 1963, the sacrificial template method, direct foaming, freeze casting, and gel casting, as described in Andre R. Studart, et al., "Processing Routes to Macroporous Ceramics: A Review," J. Am. Ceram. Soc. 89 [6], 1771-89 (2006); Urs T. Gonzenbach, et al., "Macroporous Ceramics from Particle-Stabilized Wet Foams," J. Am. Ceram. Soc. 90 [1], 16-22 (2007); Byung-Ho Yoon, et al., "Aligned porous alumina ceramics with high compressive strengths for bone tissue engineering," Scripta Materialia 58, 537-40 (2008); and P. Sepulveda and J. G. P. Binner, "Processing of Cellular Ceramics by Foaming and in situ Polymerization of Organic Monomers," J. Eur. Ceram. Soc. 19, 2059-66 (1999).

Porous ceramics fabricated by these methods are more suitable for purposes of filtration, insulation, catalyst support, and the like. These ceramics are not very effective preforms for reinforcement purposes, due to the characteristics of their cellular structures. Moreover, conventional open foams are characterized by structures of cells interconnected by randomly distributed necks of varying sizes and shapes. Thus, composites made from such preforms may display randomly distributed weak regions. These weak regions result in a weakening of the overall mechanical properties of the material and an undesirable increase in the variability of other material properties.

It therefore would be desirable to provide improved methods of forming ceramic materials for use in structural applications. It would also be desirable to provide ceramic materials having improved properties, for example, to render them more suitable for use in various structural applications.

SUMMARY

In one aspect, a method of making a ceramic preform having two-dimensional interconnected channels therein is provided. The method includes (i) positioning a sacrificial material having a selected profile within a bed of ceramic powder; (ii) compacting the bed of ceramic powder to form a compacted mass; (iii) heating the compacted mass to thermally transform the sacrificial materials into a fluid without cracking the compacted mass; and (iv) removing the fluid from the compacted mass, thereby leaving a two-dimensional network of interconnected channels having the selected profile of the sacrificial material within the compacted mass.

In another aspect, a ceramic preform having two-dimensional interconnected channels therein is provided. In certain embodiments, the ceramic preform includes a compacted mass of a ceramic powder and a two-dimensional network of interconnected channels within the compacted mass. In one embodiment, a ceramic preform is provided that is made by a method that includes (i) positioning a sacrificial material having a selected profile within a bed of ceramic powder; (ii) compacting the bed of ceramic powder to form a compacted mass; (iii) heating the compacted mass to thermally transform the sacrificial materials into a fluid without cracking the compacted mass; and (iv) removing the fluid from the compacted mass, thereby leaving a two-dimensional network of interconnected channels having the selected profile of the sacrificial material within the compacted mass.

DETAILED DESCRIPTION

Figure 1:
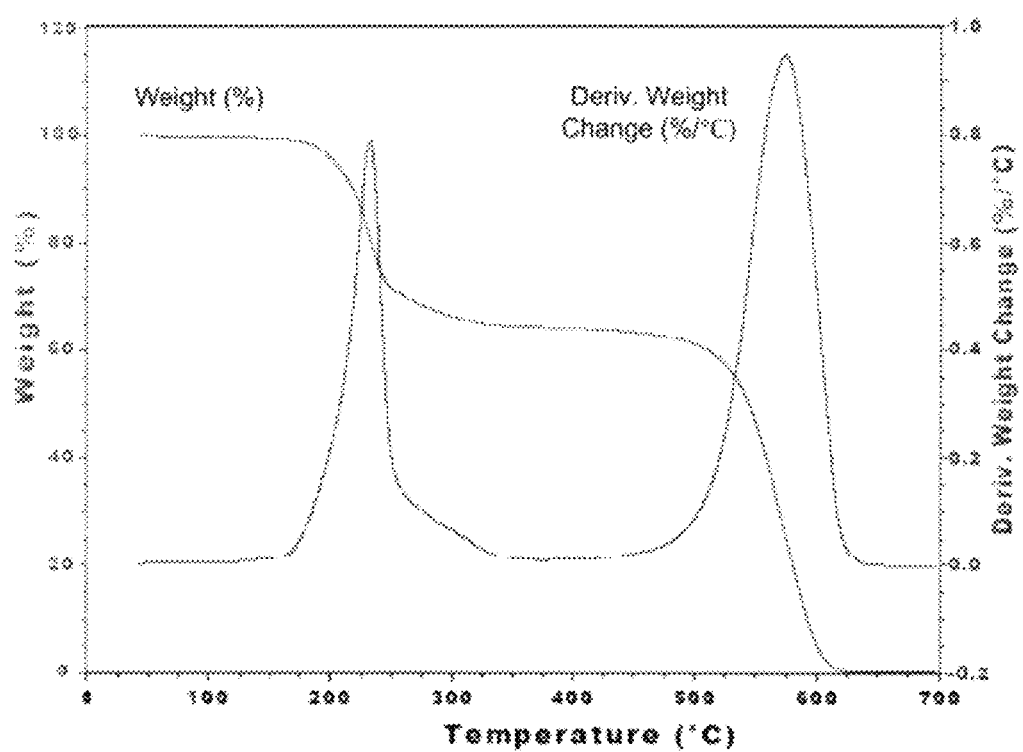
FIG. 1 is a graph showing the thermo-gravimetric analysis of PEG rolled carbon fiber in air.

The present application will now be described more fully hereinafter with reference to the accompanying drawings, in which like numerals refer to like elements.

In one aspect, methods for fabricating regular two-dimensional (2-D) network channels in ceramic materials have been developed. These methods may generally include providing an array of suitable sacrificial materials within a ceramic powder matrix and applying heat to the matrix to expel the sacrificial material, thereby forming channels within the matrix. In certain embodiments, 2-D regular interconnected channels in the form of network grids are fabricated in alumina matrices utilizing soft metal alloys or carbon fibers as the sacrificial materials.

As used herein, the term two-dimensional (2-D) is used to refer to relatively two-dimensional structures, i.e., structures mostly confined to a narrow band. In other words, two-dimensional refers to a structure which is in macro scale in two dimensions and micro scale in the third dimension.

The ceramic powders described herein may include any ceramic material known in the art, such as alumina, beryllia, ceria, zirconia, and combinations thereof.

In one embodiment, a method is provided that utilizes soft metals (e.g., metals or alloys having low Modulus of Elasticity, or Young's Modulus) or other materials having a low melting temperature. The soft metal may be weaved, soldered, or molded (e.g., cast) into a desired configuration and sandwiched in a bed of ceramic powder. For example, the soft metal may be in the form of a grid and/or have a regular spacing in one or both directions of the two-dimensional network. After compacting the bed of powder, it is heated and, so that the soft metal or other material melts and may be removed from the ceramic matrix. For example, the heated compacted bed may be rotated such that the molten metal flows out of the matrix under the action of centrifugal forces, leaving its profile as channels. That is, gravitational and/or centrifugal forces may be applied to eject the molten sacrificial metal material from the green matrix, to form open channels that possess the shape/dimensions of the metal material that was sandwiched in the ceramic powder.

In another embodiment, a method is provided that involves forming the desired channel structure using carbon fibers. An array of carbon fibers is sandwiched in a bed of ceramic powder and compacted. The compacted mass is subjected to thermal treatment. For example, the carbon fibers may be burned in air at a temperature between 450° C. and 630° C. The carbon fiber undergoes combustion into gaseous product which escapes through the pores in the ceramic matrix compact, thus leaving the profile of the carbon fibers as internal channels in the ceramic material.

In other embodiments, more than one array of sacrificial materials is compacted in the bed of ceramic powder to produce a ceramic matrix containing multiple layers of 2-D channels.

In certain embodiments, pressureless sintering may be performed following removal of the sacrificial material to produce ceramic preforms having the desired 2-D channel network profiles. For example, the ceramic preform may be sintered at a temperature between 1400° C. and 1700° C.

Figure 3A:
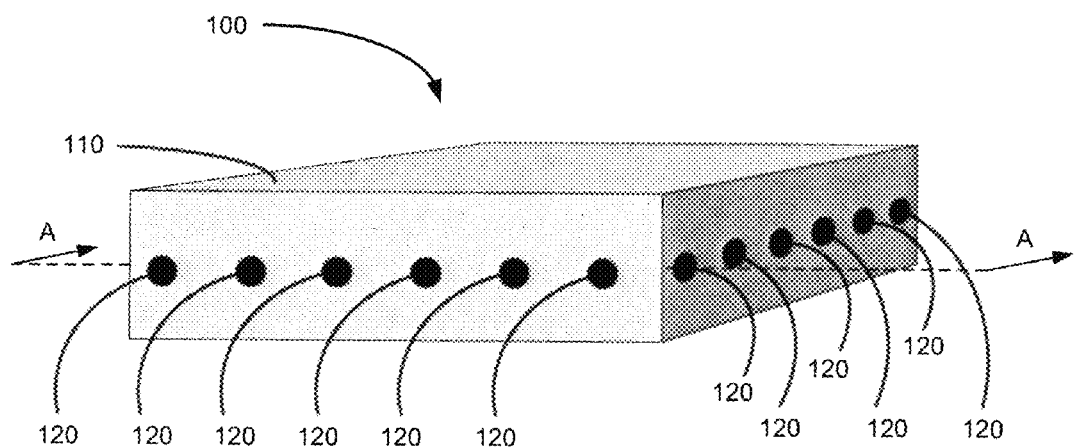
FIGS. 3a-b are perspective and cross-sectional views of ceramic performs having internal channels in accordance with one or more embodiments of the present invention.
Figure 3B:
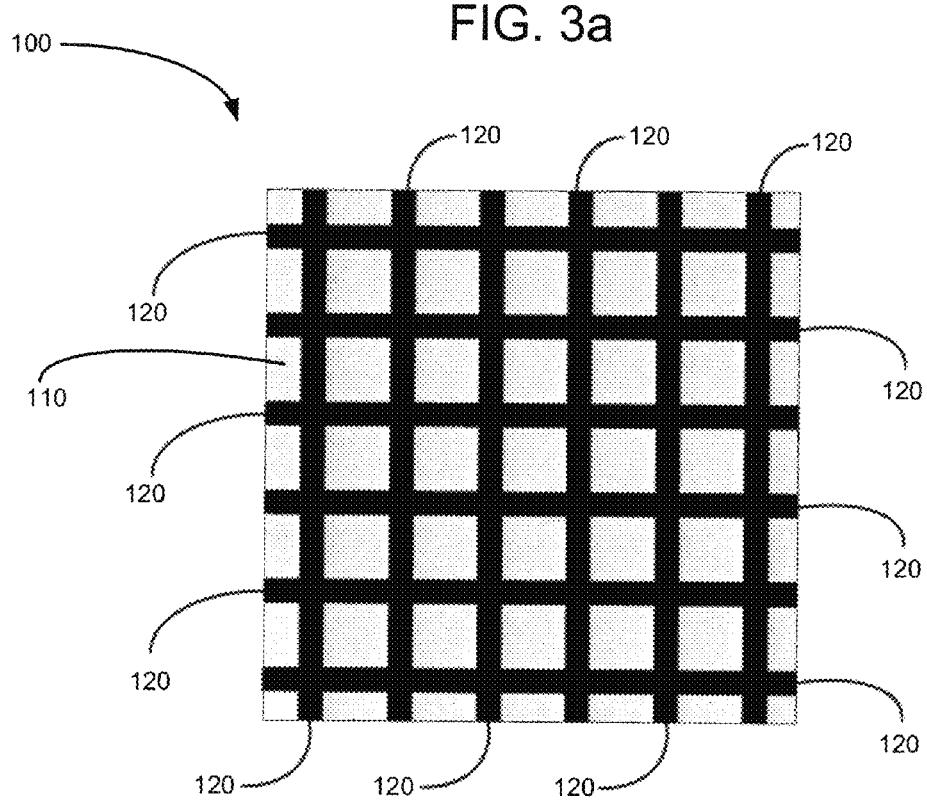

In another aspect, a reinforced ceramic preform having 2-D interconnected channels is provided that is produced via any of the methods described herein, as shown in FIGS. 3a-b. FIG. 3a is a perspective view of a ceramic preform structure 100 having a plurality of 2-D interconnected channels 120 within a ceramic matrix 110. FIG. 3b is a cross-sectional view of ceramic preform structure 100 taken along the plane A-A of FIG. 3a. FIG. 3b shows the plurality of channels 120, in the form of a grid, contained within the ceramic matrix 110. It is noted that the drawings are not to scale; for example, the width of the channels is exaggerated.

In yet another aspect, a second structural material may be operatively associated with a ceramic preform to produce a composite material. Specifically, the 2-D structures may be reinforced with a ductile phase material to yield very reliable composites having high fracture strength and fracture toughness. For example, the second structural material may include a ductile material that is infiltrated into the channels of the ceramic preform (e.g., via a metal infiltration process) to produce a ductile phase reinforced ceramic composite. By utilizing 2-D regular interconnected channels, the rigidity of the reinforcement, which occupies the channels, directly adds to that of the matrix, thereby advantageously increasing the load required for crack initiation as well as for crack propagation and highly enhancing the mechanical resistance of the preform. Further, it is possible to employ very low reinforcement fractions to achieve high reinforcement since there are no necks in these improved materials, and the reinforcements may be located at the desired locations. Moreover, the ability to analyze the preform and reinforcement independently will enhance composite performance analyses and compatibility-based composite component selection.

Selection of Sacrificial Materials

During the thermal treatment required for removal of the sacrificial material, thermal stresses are generated, which may lead to cracking of the green matrix. Therefore, selection of the sacrificial material should be primarily based on the ability to have it completely expelled without leaving any cracks in the matrix. That is, desirable sacrificial materials will generate low or no thermal stresses during thermal treatment.

Thermal stress can be described by the following equation:

$$\sigma = E(\Delta\alpha)(\Delta T) \quad (1)$$

where $\sigma$ is the thermal stress generated, E is the modulus of elasticity of the sacrificial material, $\Delta\alpha$ is the coefficient of thermal expansion (CTE) differential between the sacrificial material and green body, and $\Delta T$ is the difference between the room temperature and the temperature where stress is relaxed during thermal treatment, which is close to the melting point of the sacrificial metal or the reaction temperature of a reactive fugitive material. Based on the relationship dictated by Equation (1), low thermal stress can only be guaranteed if the product on the right hand side of the equation is low enough.

Therefore, desirable sacrificial materials should satisfy one or more of the following criteria: (i) low modulus of elasticity; (ii) low coefficient of thermal expansion differential with the green matrix; (iii) low melting (reaction) temperature; and (iv) non wetting of sacrificial material on green ceramic matrix.

Based on the above criteria, two groups of materials: soft metals (including, but not limited to, soft solders, tin, indium and bismuth), and carbon fibers were found to be suitable sacrificial materials for these applications. Other suitable materials are also envisioned (e.g., other materials that can be burned out). Due to their size and flexibility, carbon fibers can advantageously be used to fabricate very fine channels as well as large and complex shapes within ceramic matrices. For example, carbon fibers may have diameters in the range of 5 microns or less. Furthermore, the lowest grade carbon fibers are suitable for this purpose, reducing manufacturing costs.

The methods, materials, and structures described above will be further understood with reference to the following non-limiting examples and the accompanying drawings, in which several embodiments of the application are shown.

Example 1

Ceramic Structure Made by Soft Metal Procedure

A ceramic structure was produced using soft metals. Soft metals possess low modulus of elasticity and low melting point. Even if they possess relatively high thermal expansivity, the product in Equation (1) can still be low, such that thermal stresses are not high enough to crack the green matrix. For the purposes of this example, Tin-50% Indium alloy was selected, due to its ready availability in wire form and non-toxicity. The melting point of Tin-50% Indium alloy is between 115.6° C. and 126.7° C. The Young's Modulus is 27 MPa, and the CTE~28.4 µm/m° C. Wires of the alloy were drawn to 0.35 mm diameter, and were woven to form a network of squares approximately 4 mm×4 mm. A ceramic powder was provided consisting of a mixture of 150 nm and 10% 20 nm α-alumina purchased from Accumet Engineering Corp.

After the powder mixture was poured into a steel mold and leveled, the woven wires were weighed and placed on the powder in the mold. Additional powder was introduced to cover the woven wires, thus sandwiching them within the powder in the mold. The components of the mold were then uniaxially pressed at a pressure of 178 MPa to form a compact mass. The mass was demolded and the sidewalls finished to expose the tips of the wire that were still buried in the compact mass. The compact mass was then placed inside a heated chamber fixed upon a rotatable disk. Upon the melting of the metal, the disk was rotated at a speed of approximately 50 rpm and the molten metal flowed out of the mass under resulting centrifugal forces. The removal of the sacrificial material yielded a channel structure in the green compact. The green compact was then sintered without pressure in air at 1550° C. for one hour.

A ceramic structure was also produced having a double layer of 2-D regular channels. To produce the double layer of channels, two soft metal arrays were positioned within the ceramic powder bed, separated by a layer of ceramic powder. The structure was then produced in accordance with the method as described above.

Example 2

Ceramic Structure Made by Carbon Fiber Procedure

A ceramic structure was produced using carbon fibers. In addition to satisfying the criteria of Equation (1) and non-wetting requirement, carbon fibers are suitable for forming very fine channels in ceramic matrices due to their combustive properties. Specifically, the gaseous product of carbon fiber combustion is able to escape through the pores of the compact if the reaction is completed prior to the sintering of the ceramic powder.

The reaction of carbon in air is described as follows:

$$C_{(s)} + O_{2(g)} \rightarrow CO_{2(g)} \qquad (2)$$

and demonstrates that carbon can be oxidized to carbon (iv) oxide. To determine the reaction of carbon fiber in air, a thermo-gravimetric analysis (TGA) was performed, the results of which are shown in FIG. 1. Polyethylene glycol (PEG) was rubbed on the carbon fibers, for easy wrapping of the fibers, prior to the TGA run. FIG. 1 shows that the carbon fiber began reacting at about 480° C. and the reaction was completed about 630° C. Because the sintering of alumina commences at approximately 1050° C., it follows that enough porosity would remain in the ceramic matrix to ensure the complete escape of the carbon (iv) oxide reaction product.

Carbon fiber tows were rolled into cylindrical shapes approximately 180 microns in diameter. The rolls were then woven to form a 2-D network of squares of approximately 4 mm×4 mm. Two sets of specimens were made using the woven carbon fibers, one by slip casting and another by uniaxial pressing.

For the slip cast specimens, slip was made using 60 nm α-alumina powder purchased from Accumet Engineering Corp. and Darvan 7-N sodium polymethacrylate purchased from R. T. Vanderbilt Co., Inc. as a deflocculant. A portion of the slip was cast in a gypsum mold and, after partial solidification, the woven fibers were placed on the cast slip. Then, additional slip was poured in the mold to cover the fibers. After setting and detaching from the mold, the content was then removed and allowed to completely dry outside of the mold. This was followed by pressureless sintering in air at 1550° C. for one hour. Before sintering commenced, the carbon fiber and PEG had been burnt out at lower temperatures, leaving the profile of the woven fiber in the alumina matrix.

For the uniaxially pressed specimens, a mixture of 150 nm and 10% 20 nm α-alumina purchased from Accumet Engineering Corp. was used. The woven fibers were sandwiched between the powder in a steel mold. The contents of the mold were uniaxially pressed at a pressure of 178 MPa to form a compact mass. The mass was then demolded, followed by pressureless sintering at 1550° C. for one hour.

Solid samples without channels were also prepared using the uniaxial pressing procedure for strength comparison purposes.

Example 3

Testing of Ceramic Preforms

Figure 2A:
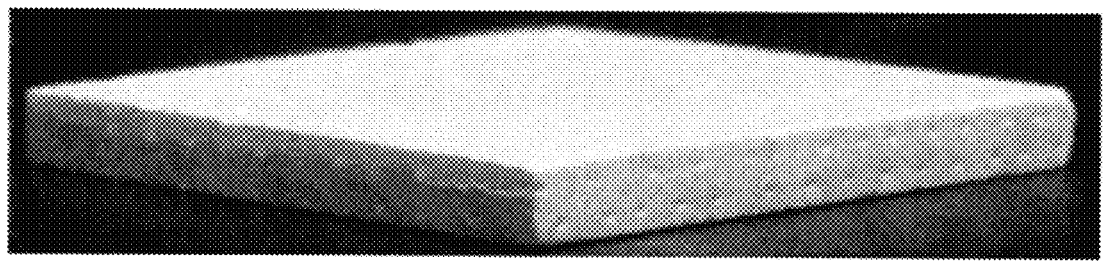
FIGS. 2a-c are photographic images of ceramic structures having internal channels in accordance with one or more embodiments of the present invention.
Figure 2B:
Figure 2C:
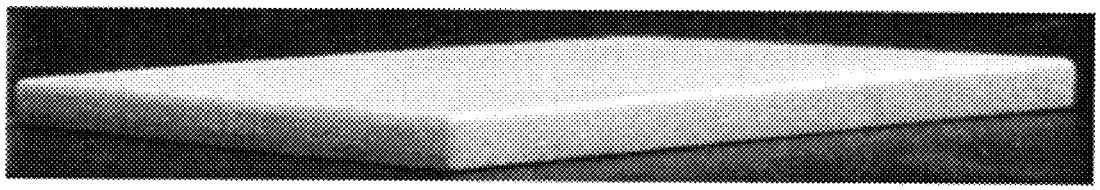

The ceramic structures produced in Examples 1 and 2 were tested. FIGS. 2a and 2b are photographic images of the preforms fabricated via the soft metal methods described in Example 1. FIG. 2a shows a sample having a double layer of 2-D regular channels fabricated from Tin-50% Indium alloy and FIG. 2b shows a sample having a single layer of 2-D regular channels fabricated from Tin-50% Indium alloy. FIG. 2c shows the preform fabricated via the carbon fiber method described in Example 2.

Figure 4A:
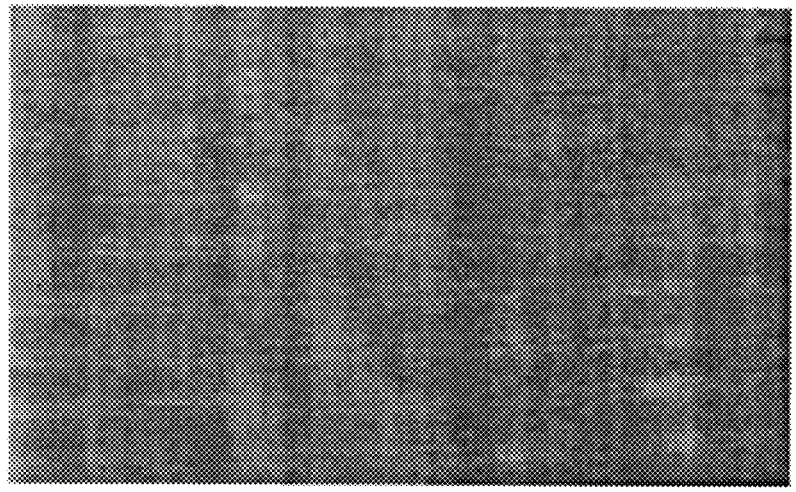
FIGS. 4a-b are x-ray images of internal channels fabricated in accordance with one or more embodiments of the present invention.
Figure 4B:

FIGS. 4a and 3b are X-Ray images of the 2-D grid network internal profiles of the regular channels of the soft metal and carbon fiber fabricated preforms, respectively. FIG. 4a shows internal channels fabricated from 0.35 mm diameter Tin-50% Indium alloy and FIG. 4b shows internal channels fabricated from 180 micron diameter carbon fiber.

Figure 5A:
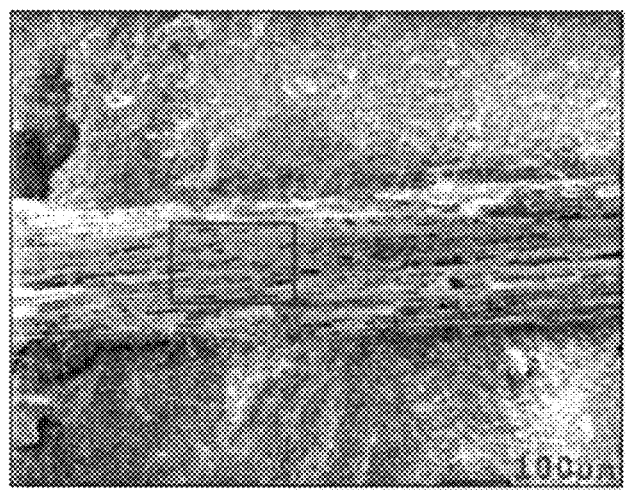
FIGS. 5a-b are SEM micrograph and EDAX spectrum images of channels fabricated in accordance with one or more embodiments of the present invention.
Figure 5B:
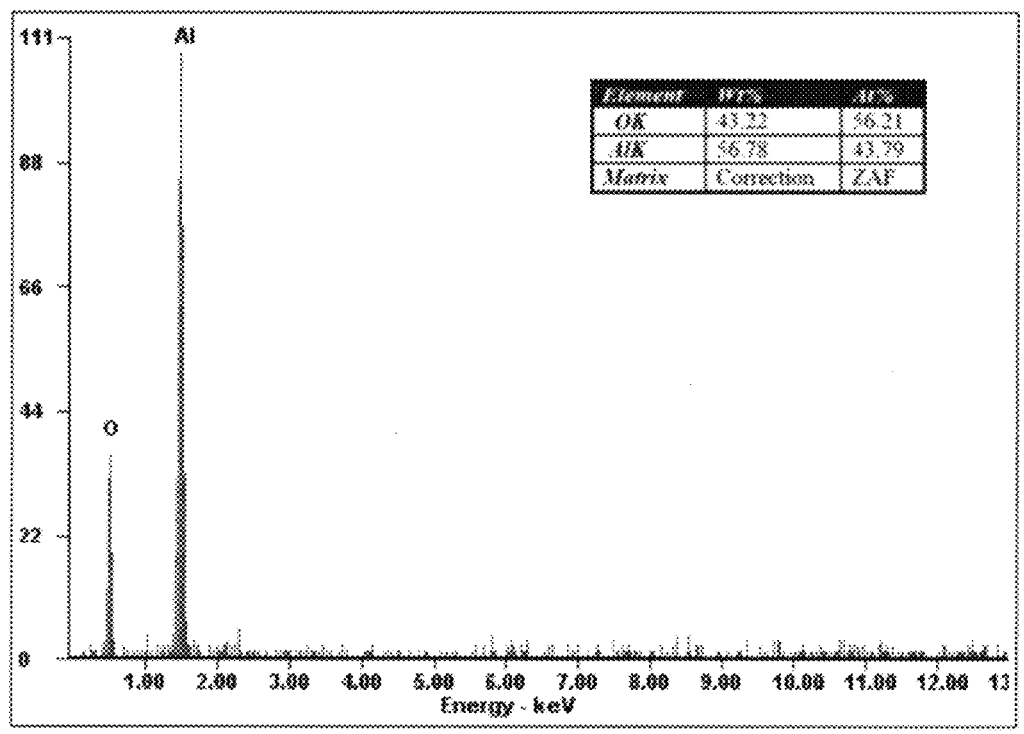

The TGA profile in FIG. 1 shows that the PEG and carbon fibers were completely burnt out at temperatures lower than 300° C. and 630° C., respectively. Thus, no residuals were expected at the walls of the channels. To confirm this, a specimen was fractured to expose a channel on which SEM and EDAX analyses were subsequently performed to characterize the channels. FIGS. 5a and 5b show the SEM micrograph and EDAX spectrum, respectively, on the boundary of the exposed channel. These results confirmed that no residual carbon material existed on the walls of the channels. Specifically, the SEM image of FIG. 5a shows a straight channel fabricated by carbon fiber. The quantitative EDAX analysis in FIG. 5b approximately shows the correct stoichiometric ratio for alumina, thereby indicating that the constituent of the channel is only alumina and that no carbon or residue was present. This result was also consistent with a visual inspection of the sample pan after the TGA run in which no residue was observed on the pan.

Figure 6:
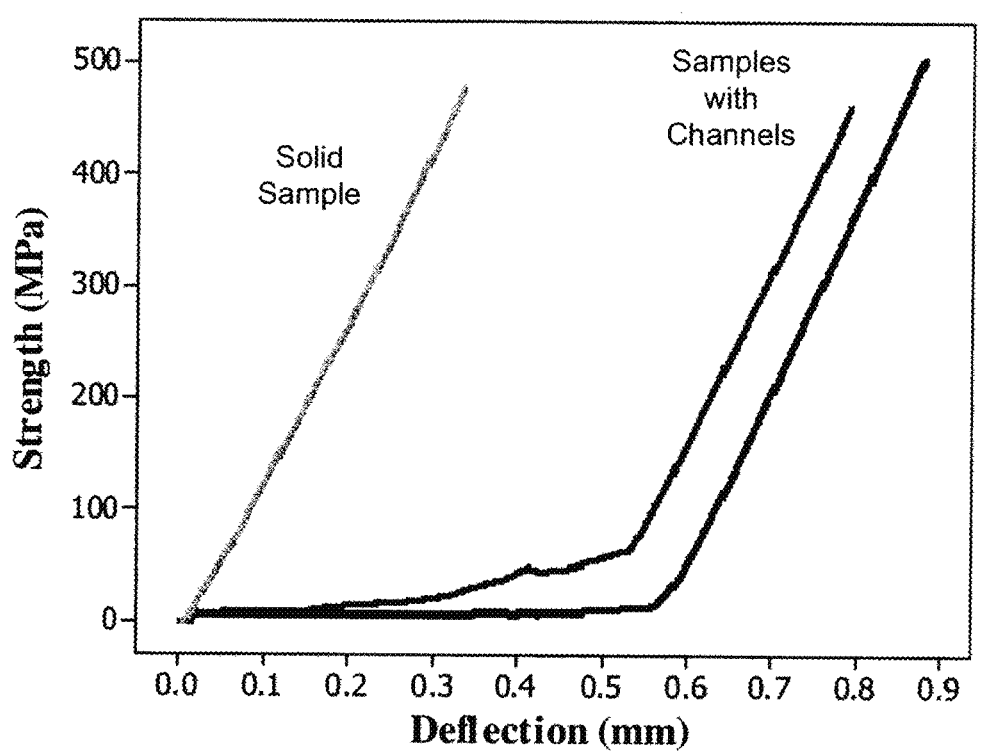
FIG. 6 is a graph displaying fracture strength as a function of deflection for ceramic structures made in accordance with one or more embodiments of the present invention.
Figure 7:
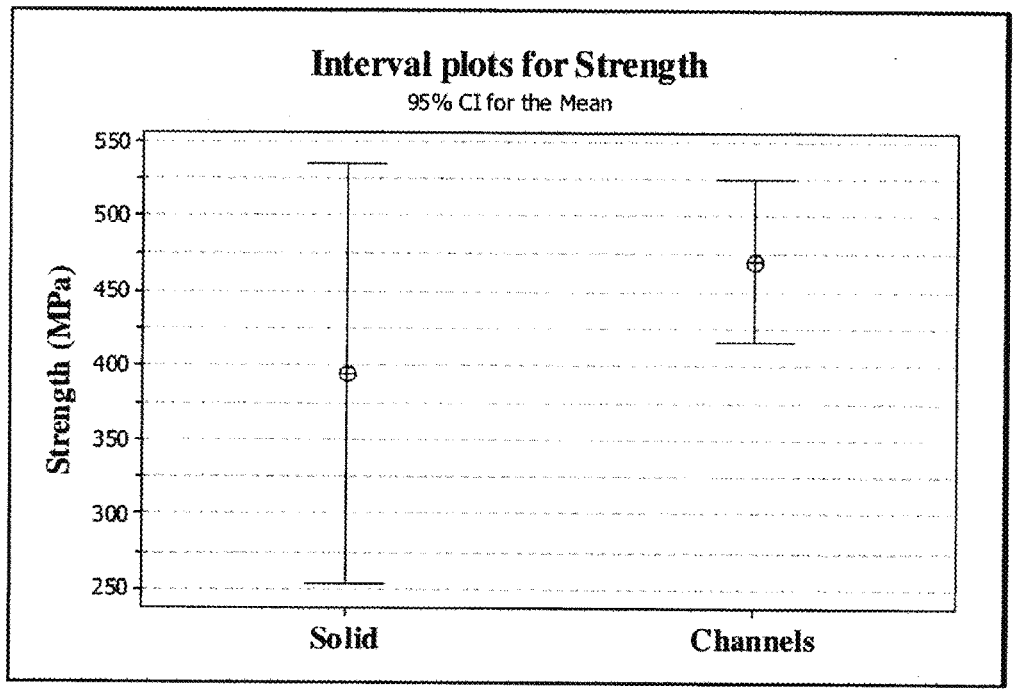
FIG. 7 is an interval plot displaying the mean and standard deviation of the data of FIG. 6.

The uniaxially pressed specimens were tested in flexure (i.e., a three-point bend test) to determine the effect of the channels on the fracture strength of the samples. The tests were carried out with the load normal to the plane of the 2-D channels at a cross-head speed of 0.5 mm/s on specimens that were cut and polished to a 3 mm×4 mm cross-section. Similar tests were also carried out on solid specimens (i.e., ceramic matrices without channels). Six specimens were tested of each specimen type. FIG. 6 contains the results of these tests and shows sample fracture strength as a function of deflection for two preforms having internals channels approximately 150 microns in diameter and one solid specimen. The preforms did not show any degradation in strength, but rather exhibited increased fracture strengths as compared to specimens without channels and low strength variability (i.e., increased reliability). Specifically, the solid specimens had a mean strength of 394 MPa and standard deviation of 133 MPa, while the specimens with the channels had a mean strength of 470 MPa and standard deviation of 52 MPa, as represented in the interval plot shown in FIG. 7.

Without being bound by a particular theory, a number of mechanisms are believed to be responsible for this strength enhancement. First, the presence of the channels may reduce the lengths of the largest cracks thereby making their effects less detrimental to the specimen. The channels also may help to blunt out various sharp cracks, which increase stress, thereby reducing stress intensities within the material. Moreover, the presence of the channels may reduce sintering stresses or contact stresses, resulting in a reduced crack population in the specimen. The reduction in crack population also may reduce the random nature of crack distribution, thereby reducing variability in properties and enhancing reliability. These various mechanisms may also work concurrently, resulting in the enhanced strengths observed.

Figure 8:
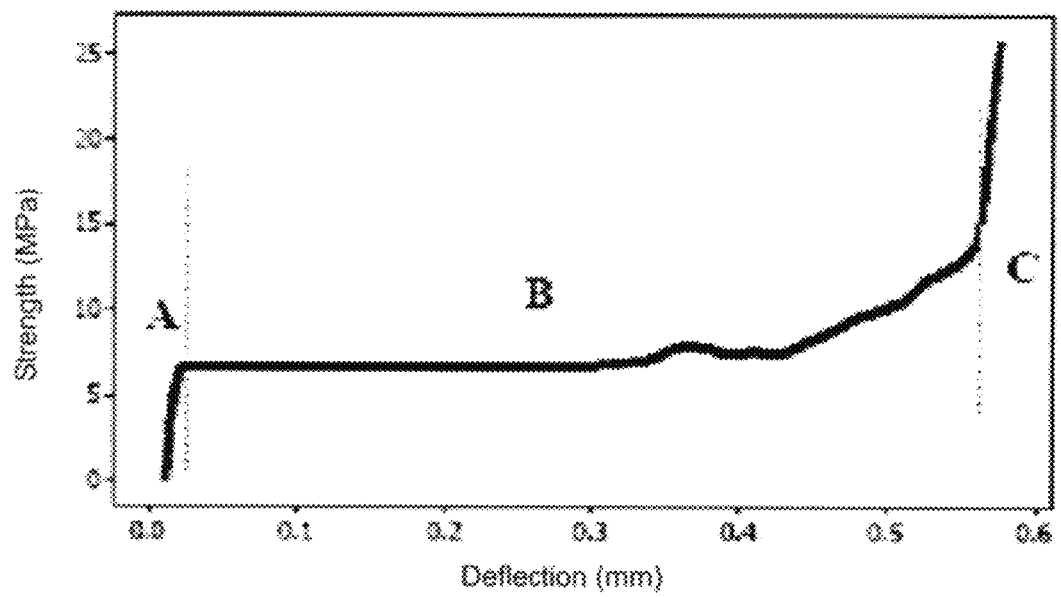
FIG. 8 is a graph displaying a selected portion of the data of FIG. 6.

In order to see the profile of the 2-D channel specimens, the initial stage of the response during the bending test (i.e., the lower section of the results for one of the 2-D specimens shown in FIG. 6) is expanded and shown in FIG. 8. Three stages are observable and labeled in FIG. 8. Initial stage A shows a very high stiffness, ductile stage B indicates significant straining, and final stage C is also characterized by very high stiffness. In stage A, the material exhibits a very high stiffness typical of ceramics. As the stress increases, the cracks grow, but soon meet the channels and are blunted out. As the cracks blunt out, there is a reduction in the rate of increase in stress and associated high strain. This is represented by the low stiffness and high strain seen in stage B. After all, or a majority, of the cracks have been blunted out, the material regains the characteristics of a solid specimen as shown in stage C.

To confirm these occurrences, some of the specimens with channels were loaded slightly beyond 20 MPa and the test was stopped before fracture. The specimens were then loaded again, until fracture occurred. The profile observed in this confirmation test did not contain stages A and B but only stage C, because the cracks were already blunted out before the reloading.

It is of note that all of the 2-D specimens display stage C profiles that are parallel to the solid specimen profile in FIG. 6. This suggests that the 2-D channel specimens have not been degraded by the presence of the channels, but rather have been enhanced. Nonetheless, for strength degradation to be completely avoided, the fraction of the channels should be very small so as to not significantly reduce the cross-section of the specimens. For example, the 2-D channel specimens tested in this work have channel diameters of approximately 150 microns, resulting in an area fraction of 1.25%. To achieve the desired area fraction, sacrificial materials should be sized in accordance with the observed sintering shrinkage of about 17%. That is, the resulting channels usually display a diameter less than that of the sacrificial materials. Channels are envisioned having diameters in the range of 5 microns to 500 microns.

Figure 9:
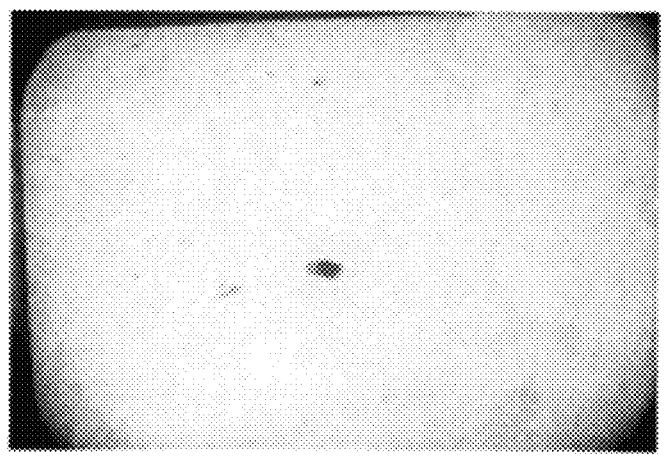
FIG. 9 is an optical microscope image of the fractured surface of a ceramic structure made in accordance with one or more embodiments of the present invention.

FIG. 9 shows a typical optical microscope image of the fractured surface of a specimen (e.g., after a three-point bend test) containing a central channel. As is depicted, the relative size of the channel with respect to the overall component is significant.

Publications cited herein and the materials for which they are cited are specifically incorporated by reference. Modifications and variations of the methods and devices described herein will be obvious to those skilled in the art from the foregoing detailed description. Such modifications and variations are intended to come within the scope of the appended claims.

We claim:

1. A method for making a ceramic preform comprising:
positioning a sacrificial material within a bed of ceramic powder, the sacrificial material having a selected profile;
compacting the bed of ceramic powder, including the sacrificial material, to form a compacted mass;
heating the compacted mass to thermally transform the sacrificial material into a fluid without cracking the compacted mass; and
removing the fluid from the compacted mass, thereby leaving a two-dimensional network of interconnected channels within the compacted mass, the channels having the selected profile of the sacrificial material,
wherein the sacrificial material comprises a plurality of metal wires.

2. The method of claim 1, wherein the metal wires comprise a metal having a Young's modulus of less than 60 GPa.

3. The method of claim 2, wherein the metal comprises tin, indium, bismuth, or a combination thereof.

4. The method of claim 1, wherein removing the fluid comprises rotating the compacted mass to exert centrifugal forces on the fluid in the compacted mass.

5. The method of claim 1, wherein the network of interconnected channels is in the form of a grid.

6. The method of claim 1, wherein the interconnected channels have a regular spacing in one or both directions of the two-dimensional network.

7. The method of claim 1, wherein the sacrificial material is in the form of a woven sheet of the sacrificial material.

8. The method of claim 1, wherein compacting the bed of ceramic powder is performed in a mold.

9. The method of claim 1, further comprising sintering the compacted mass having the two-dimensional network of interconnected channels.

10. The method of claim 9, wherein the sintering is performed at a temperature from 1400° C. to 1700° C.

11. The method of claim 1, wherein the one or more of the interconnected channels has a diameter from 5 microns to 500 microns.

12. The method of claim 1, wherein the ceramic powder comprises alumina.

13. The method of claim 1, wherein the cross-sectional area fraction of the interconnected channels to the compacted mass is from 0.5% to 2%.

14. A method for making a ceramic preform comprising:
positioning a sacrificial material within a bed of ceramic powder, the sacrificial material having a selected profile;
compacting the bed of ceramic powder, including the sacrificial material, to form a compacted mass;
heating the compacted mass to thermally transform the sacrificial material into a fluid without cracking the compacted mass; and
removing the fluid from the compacted mass, thereby leaving a two-dimensional network of interconnected channels within the compacted mass, the channels having the selected profile of the sacrificial material,
wherein the sacrificial material is in the form of a woven sheet of carbon fibers.

15. The method of claim 14, wherein the heating is performed at a temperature from 450° C. to 630° C.

16. The method of claim 14, further comprising sintering the compacted mass having the two-dimensional network of interconnected channels.

17. The method of claim 16, wherein the sintering is performed at a temperature from 1400° C. to 1700° C.

* * * * *